(12) United States Patent
Fint et al.

(10) Patent No.: US 6,829,884 B2
(45) Date of Patent: Dec. 14, 2004

(54) ROCKET ENGINE COMBUSTION CHAMBER HAVING MULTIPLE CONFORMAL THROAT SUPPORTS

(75) Inventors: Jeffry A. Fint, Granada Hills, CA (US); Douglas S. Ades, North Hills, CA (US); Michael B. Hankins, Simi Valley, CA (US); Maynard L. Stangeland, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 114 days.

(21) Appl. No.: 10/299,423

(22) Filed: Nov. 19, 2002

(65) Prior Publication Data

US 2004/0093852 A1 May 20, 2004

(51) Int. Cl.[7] .................. F02K 11/00; B21D 53/00; B64D 33/04
(52) U.S. Cl. ............... 60/267; 239/127.1; 29/890.01
(58) Field of Search ............... 60/266, 267; 29/890.01; 239/127.1

(56) References Cited

U.S. PATENT DOCUMENTS

| | | | |
|---|---|---|---|
| 5,375,325 A | * | 12/1994 | Bales et al. ............ 29/890.01 |
| 5,386,628 A | * | 2/1995 | Hartman et al. ......... 29/890.01 |
| 5,701,670 A | | 12/1997 | Fisher et al. ............ 29/890.01 |
| 6,688,100 B1 | * | 2/2004 | Wherley et al. ............ 60/257 |

* cited by examiner

Primary Examiner—Charles G. Freay
(74) Attorney, Agent, or Firm—Larry N. Ginsberg; William C. Anderson

(57) ABSTRACT

In a first assembly step a coolant liner is formed having an outside surface. A plurality of coolant channels are formed on the outside surface. At least two inner conformal throat support sections and at least two outer conformal throat support sections are formed. The two inner conformal throat support sections are formed around the outside surface of the coolant liner to form a closed inner conformal throat outside surface. The inner conformal throat support sections are joined at inner throat seam lines. At least two outer conformal throat support sections are assembled around the closed inner conformal throat outside surface so as to cover the inner throat seam lines, to form a liner throat support assembly. An inlet manifold and an outlet manifold are assembled around the liner throat support assembly to form a hot isostatic press (HIP) assembly. A HIP'ed assembly is formed by HIP'ing the HIP assembly.

18 Claims, 2 Drawing Sheets

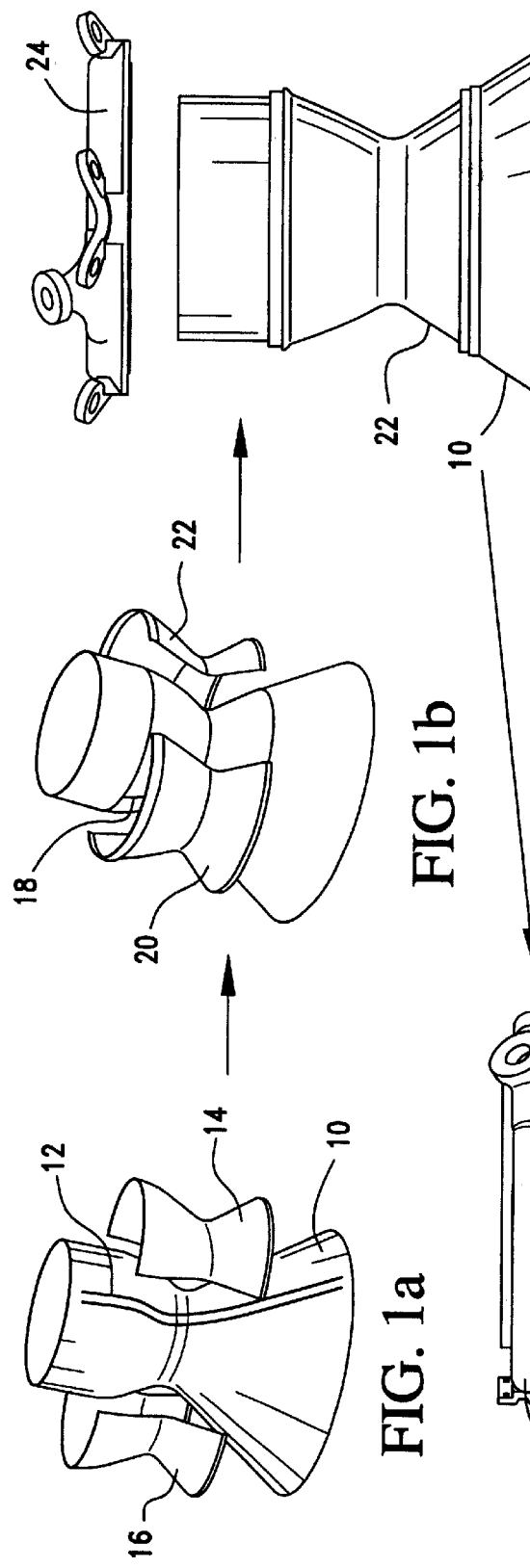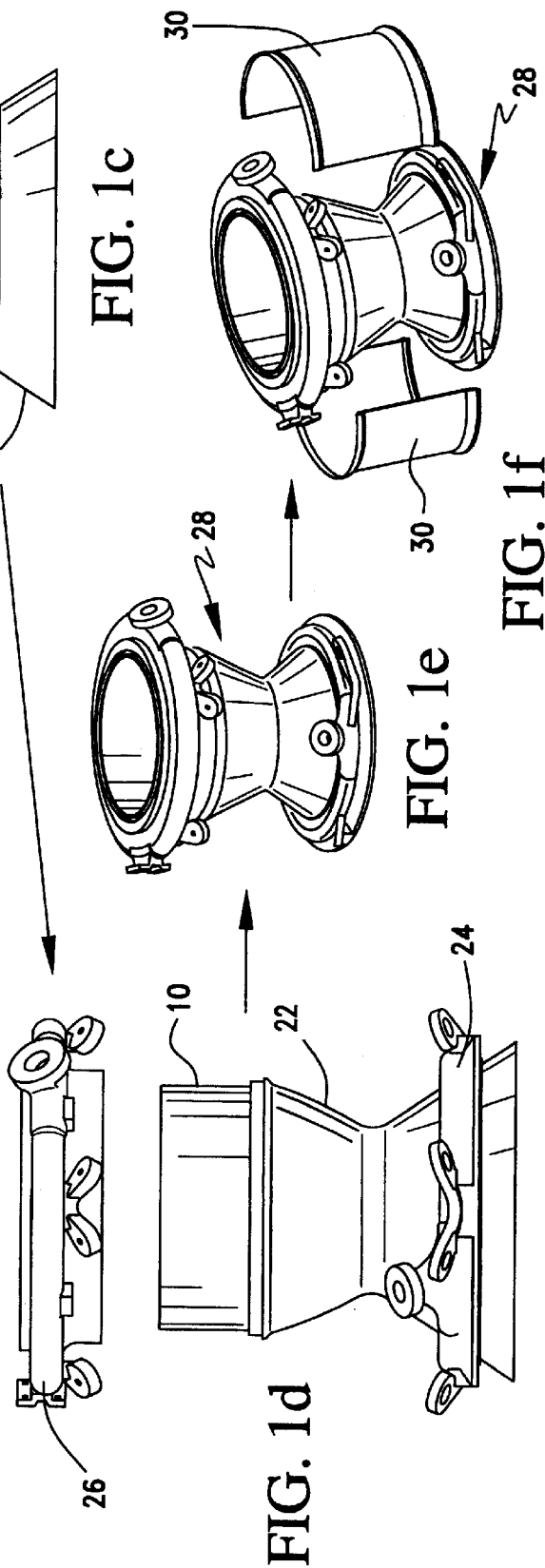

ROCKET ENGINE COMBUSTION CHAMBER HAVING MULTIPLE CONFORMAL THROAT SUPPORTS

BACKGROUND OF THE INVENTION

1. Field of the Invention

The present invention relates to rocket engine combustion chamber fabrication and more particularly to a rocket engine combustion chamber having multiple conformal throat supports.

2. Description of the Related Art

The function of a rocket engine combustion chamber is to contain the combustion process (typically at 5000° F. to 6000° F. at 1000 to 4000 pounds per square inch pressure) and then accelerate the combustion products to a high velocity and exhaust them to create thrust. Typically, the combustion process takes place subsonically in the combustion chamber. The subsonic combustion gases are then accelerated supersonically through a converging/diverging DeLaval-type nozzle/venturi.

The combustion chamber typically includes a structure to contain the combustion pressure, a cooled liner to protect the pressure vessel from the hot combustion gases, and manifolding required to circulate the coolant. Because of its inherent hourglass shape, combustion chambers are typically fabricated by starting with the coolant liner and building the pressure vessel jacket and manifolding around its external hourglass contour or starting with the pressure vessel and manifolding structure and building the coolant liner inside its internal hourglass contour. Materials of construction typically consist of copper base alloys for the coolant liner because of their high thermal conductivity and nickel-base alloys for the pressure vessel jacket and manifolds because of their high specific strength.

Currently, there are several methods of making combustion chambers with coolant channels. All of the methods in use today involve many fabrication steps each of which require critical inspections and possible rework if flawed. These processes are time consuming and expensive.

In one method, a coolant liner is machined from a billet of material with the inner and outer hourglass shape. Coolant passage slots are machined on the outer surface of the liner. The coolant passages are then closed out using a plating process. The plating process is very labor-intensive, requiring several critical operations and is fraught with problems which can cause a considerable amount of rework in a typical chamber.

During the channel closeout process, the liner slots are filled with a wax material. The outer exposed surface is then burnished with a silver powder which forms a conductive plateable surface. On that surface, a hydrogen barrier may be plated as applicable, which is then followed by plating a build up of nickel to form a structural closeout to contain the coolant pressure. The nickel close out requires several plating cycles and several intermediate machining steps. All of the plating operations are subject to problems such as contamination, plating solution chemistry, and other process parameters that can lead to poor bonding of the plated material. If an anomaly occurs during this process, the plated material on the liner has to be machined back and the plating process repeated. Using this technique requires considerable time and labor to close out a liner.

Following the plating operations, the wax material must then be removed from the liner. This is a critical process, since any residual wax material can lead to contamination problems in subsequent operations.

When the liner is completed, the next step is to weld the inlet and outlet coolant manifolds to the liner structure. Local areas on the liner need to be built up with a considerable amount of electrodeposited nickel and machined backed to form a surface that can accommodate the weld joints. The manifolds are then welded onto the closed-out liner. Then the structural jacket, which is made up of several pieces, is assembled around the outside of the liner and manifold subassembly and welded in place. All of the weld joints are critical and require inspections. Any flaws found must be reworked. A typical combustion chamber may require as many as 100 critical welds. The process is very costly and time consuming. Utilizing this process, a complete main combustion chamber can take three (3) years to fabricate.

Another main combustion chamber fabrication method utilizes a "platelet" liner concept. In this method, the liner itself is made up of a stack of several very thin plates which are photochemically etched to form coolant slots, individually plated, stacked together, and then bonded to form a flat panel section of the liner with closed-out coolant passages. The flat panels are then formed to make up a section of the hour-glass shape liner. One of the plating processes or the bonding processes can result in a joint failure during the forming process a bad joint, which would be reason to scrap the part. Typically seven or more individual panels are required to form an hourglass-shaped liner. The individual panels are installed inside the structural jacket. Since a longitudinal joint is required between each of the adjacent panels, there are several locations for potential hot-gas leakage between the panels along the entire length of the combustion chamber. Also, all of the panels once installed, have to be bonded to the outer structural jacket. In order to bond the panels to the outer structural jacket, pressure bags are fabricated to match the contour of the thrust chamber. The bags are installed inside the thrust chamber liner along with backup tooling to support the pressure bags. The chamber and tooling are placed into a brazing furnace and brought up to temperature while the pressure is maintained in the pressure bags, which forces the liner into intimate contact with the jacket to create a bond joint a bond joint between the closed-out liner and the structural jacket. Pressure bags have not been 100% reliable since they can burst or leak, and it is very difficult to fabricate and maintain the correct geometry of a thin conformable pressure bag that will match the complex geometry of the combustion chamber liner and still contain the pressure required at bonding temperature.

U.S. Pat. No. 5,701,670, issued to Fisher et al. discloses a method of making a rocket engine combustion chamber utilizing a "slide in" port liner. The '670 invention utilizes three basic components to form a combustion chamber for high-performance rocket engines: (1) a structural jacket, (2) a single-piece coolant liner, and (3) a plurality of throat support sections. The combustion chamber fabrication is described in the following steps. A liner is machined which has coolant channels formed in the outer surface. Throat support sections are fabricated and assembled around the indentation created by the venturi shape of the combustion chamber liner. The throat supports and the liner are then slid into the structural jacket. A welded or brazed seal joint between the liner and the structural jacket is made at the both forward and the aft end of the chamber. Any access ports to the coolant manifold system are closed off for the HIP bond cycle. The coolant passages and voids between the throat support sections and the structural jacket are thus sealed off from the outside environment. The entire assembly is then placed into a furnace. The furnace is pressured and then brought up to bonding temperature. To aid in the bonding process, a vacuum may be drawn on the coolant passages and the void in the throat support area. At temperature, with the pressure applied to the entire outer surface of the jacket as well as the inner surface of the liner, the liner is forced to conform to the structural jacket and throat support contour, resulting in intimate contact at all the braze interfaces. At pressure and temperature, with intimate contact between the four parts, a bond joint is created between the liner and the structural jacket. Bond joints are also formed between the liner and the throat support sections, between the throat support sections themselves, and between the throat supports and the structural jacket. All of the bonding is done in one step in the pressurized furnace without requiring special tooling to force the parts into intimate contact. This method of fabrication closes out the coolant liner channels without having to utilize complicated wax filling, silver burnishing, electroplating, and machining process steps which have caused considerable problems in the past. Once the bonding is complete, the seal joint at the forward and aft end of the chamber is no longer required and may be removed from the assembly. The method eliminates all welds from the finished part. The invention is an improvement over past processes because there are no welds, there is no structural plating, and the critical liner is completely fabricated from a single piece of metal thus eliminating any joints required to form coolant channels. Further, there are no joints to be sealed longitudinally or anywhere else in the hot gas wall of the liner. The invention uses an integral liner that is machined from a single piece, which forms a barrier to isolate the hot gas from the structural jacket and preclude the coolant from leaking out into the hot gas which can cause a lack of coolant for the structural jacket. The resultant part, however, is heavier than those using the manufacturing techniques described earlier in this Description of the Related Art. Although, methods exist to reduce weight at the end of the process, all such methods have risk and all add cost. Additionally, the structural jacket may be structurally inefficient owing to the requirement to be compatible with the HIP braze process. Finally, the process potentially introduces the high pressure coolant gas in the liner to intimate contact with the structural jacket.

SUMMARY

In a broad aspect, the present invention comprises a method of fabricating a rocket engine combustion chamber including a number of assembly steps. A coolant liner is formed having an outside surface. A plurality of coolant channels are formed on the outside surface. At least two inner conformal throat support sections and at least two outer conformal throat support sections are formed. The two inner conformal throat support sections are installed around the outside surface of the coolant liner to form a closed inner conformal throat outside surface. The inner conformal throat support sections are joined at longitudinal inner throat seam lines. At least two outer conformal throat support sections are then assembled around the closed inner conformal throat outside surface so as to cover the inner throat seam lines, to form a liner throat support assembly. An inlet manifold and an outlet manifold are assembled around the liner throat support assembly to form a hot isostatic press (HIP) assembly. A HIP'ed assembly is formed by HIP'ing the HIP assembly. Fabrication costs are minimized by obviating any requirement of a structural jacket during HIP'ing. Weight is minimized as a result of utilizing the inner and outer conformal throat supports.

Other objects, advantages, and novel features will become apparent from the following detailed description of the invention when considered in conjunction with the accompanying drawings.

BRIEF DESCRIPTION OF THE DRAWINGS

FIGS. 1a–1f are perspective views of the combustion chamber illustrating the assembly steps thereof.

The same parts or elements throughout the drawings are designated by the same reference characters.

DETAILED DESCRIPTION OF THE INVENTION

Figure 2:
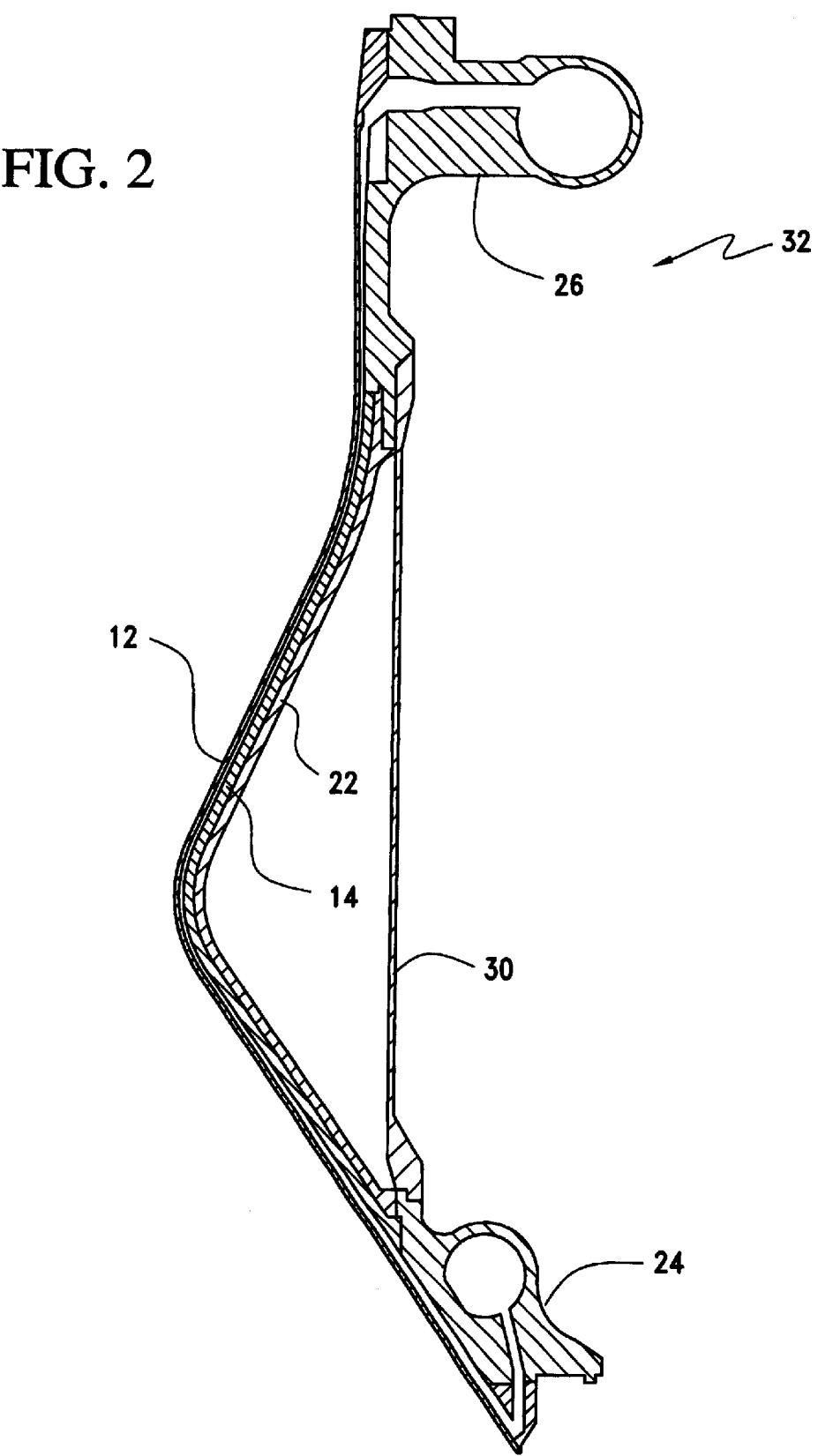
FIG. 2 is a cross sectional view of the completed combustion chamber.

Referring now to the drawings and the characters of reference marked thereon, FIGS. 1a–f illustrate the preferred assembly steps of the present invention. In a first step in the fabrication process, as shown in FIG. 1a, a coolant liner 10 is machined which has coolant channels 12 formed on its outer surface. The coolant liner 10 may be formed of steel, copper and/or other suitable alloys thereof. NARloy-Z is the alloy presently used by present assignee, The Boeing Company, on the Space Shuttle and Delta IV combustion chambers.

As can be seen in this figure, two inner conformal throat support sections 14, 16 are fabricated and assembled around the outside surface of the coolant liner 10. The inner conformal throat support sections 14, 16 are preferably formed by low-cost fabrication processes such as by drop forging and final machining.

Referring now to FIG. 1b the inner conformal throat support sections 14, 16 are joined at inner throat seam lines, this Figure showing one of the seam lines 18. The throat support sections 14, 16 are joined at seam lines during the braze operation with braze alloy placed on the faces to be joined. Thus, the outside surface of the resulting inner conformal throat is closed.

As FIG. 1b illustrates, outer conformal throat support sections 20, 22 are then assembled around the outside surface of the inner conformal throat to cover the inner throat seam lines 18. (The outer conformal throat support sections 20, 22 may be formed of the same or similar material as the inner conformal throat support sections 14, 16) The resultant structure is a liner throat support assembly. The outer conformal throat support sections 20, 22 are preferably installed 90 degrees from the inner conformal throat support sections 14, 16. It is not a necessity that they be installed 90 degrees apart; however, it is important that the inner throat seam lines 18 be entirely covered. The resultant structure is gas tungsten arc weld (GTAW) braze sealed along the outer throat support joint line creating a closed structure.

Referring now to FIGS. 1c and 1d, an inlet (i.e. aft) manifold 24 and an outlet (i.e. forward) manifold 26 are assembled around the liner throat support assembly. The manifolds 24, 26 are fabricated to preferably create a slight shrink fit about the liner throat support assembly for the GTAW brazing processes. Braze alloy is placed circumferentially around the throat support sections where the manifolds are shrink-fitted. Again, GTAW braze sealing is applied at the joints between the manifolds, and the throat support sections, sealing the manifolds to the liner. The resulting structure is a hot isostatic press (HIP) assembly, designated generally as 28 in FIG. 1e.

Summarizing the use of braze alloy, it is inserted between the coolant liner 10 and the inner conformal throat support sections 14, 16; and, between the inner conformal throat support sections 14, 16 and the outer conformal throat support sections 20, 22; and, between the outer conformal throat support sections 20, 22 and the inlet and outlet manifolds 24, 26; and, between the coolant liner 10 and the inlet and outlet manifolds 24, 26.

The HIP assembly 28 is HIP'ed to form a HIP'ed assembly. Prior to assembly, the coolant liner, the inner and outer conformal throat support sections and the inlet and outlet manifolds are preferably coated with wetting materials. (The lands on the coolant liner are the portions that are wetted.) The wetting materials may be, for example, gold or nickel, deposited on the surfaces. HIP'ing the HIP assembly involves forming sealing joints between the coolant liner, the inner and outer conformal throat support sections and the inlet and outlet manifolds to create a sealed cavity having a differential pressure from the ambient pressure. The sealed assembly is closed to the HIP gas, thus providing no means of pressure equalization for the assembly relative to the HIP furnace. Alternatively, an active vacuum may also be used to decrease the pressure and remove any adsorbed materials during assembly.

Finally, as illustrated in FIG. 1f, a structural jacket 30 is assembled about the HIP'ed assembly 28. The structural jacket 30 may be, for example, electron beam welded about the HIP'ed assembly 28 because this structural jacket is added after HIP and does not have a requirement to be compatible with the HIP assembly during HIP. This provides a substantial weight savings as the structural jacket only needs to handle rocket engine loads and not pressures generated during HIP.

Referring now to FIG. 2, a crossectional view of the completed rocket engine combustion chamber is illustrated, designated generally as 32. This figure illustrates that the process of the present invention produces a completed combustion chamber comparable to any other state of the art combustion chamber.

Obviously, many modifications and variations of the present invention are possible in light of the above teachings. For example, although the use of wetting materials was described, it is possible that with an alternative method of manufacture surfaces are kept clean and free of oxide so that the surfaces can be diffusion bonded.

It is, therefore, to be understood that within the scope of the appended claims, the invention may be practiced otherwise than as specifically described.

What is claimed and desired to be secured by Letters Patent of the United States is:

1. A method of fabricating a rocket engine combustion chamber, comprising the steps of:

a) forming a coolant liner having an outside surface;

b) forming a plurality of coolant channels on the outside surface of the coolant liner;

c) forming at least two inner conformal throat support sections and at least two outer conformal throat support sections;

d) assembling said at least two inner conformal throat support sections around said outside surface of said coolant liner to form a closed inner conformal throat outside surface, said inner conformal throat support sections being joined at inner throat seam lines;

e) assembling said at least two outer conformal throat support sections around said closed inner conformal throat outside surface so as to cover said inner throat seam lines, to form a liner throat support assembly;

f) assembling an inlet manifold and an outlet manifold around said liner throat support assembly to form a hot isostatic press (HIP) assembly; and, g) HIP'ing said HIP assembly to form a HIP'ed assembly, wherein fabrication costs are minimized by obviating any requirement of a structural jacket during HIP'ing and weight is minimized as a result of utilizing said inner and outer conformal throat supports.

2. The method of claim 1, wherein said step of HIP'ing said HIP assembly comprises the steps of forming sealing joints between said coolant liner, said inner and outer conformal throat support sections and said inlet and outlet manifolds to create a sealed cavity having a differential pressure from the ambient pressure.

3. The method of claim 1, wherein said steps of forming at least two inner conformal throat support sections and said at least two outer conformal throat support sections comprises forming and assembling two inner conformal throat support sections and two outer conformal throat support sections.

4. The method of claim 1, further comprising the steps of:

a) coating said coolant liner with a first wetting material;

b) coating said inner and outer conformal throat support sections with a second wetting material; and, c) coating said inlet and outlet manifolds with a third wetting material, said coating steps defined by steps a, b and c, above, being performed prior to HIP'ing said HIP assembly.

5. The method of claim 1, further comprising the steps of inserting a braze alloy between said coolant liner and said inner and outer conformal throat support sections; and, between said inner and outer conformal throat support sections; and, between said outer throat support sections and said inlet and outlet manifolds; and, between said coolant liner and said inlet and outlet manifolds.

6. The method of claim 1, further comprising the step of inserting a braze alloy between said coolant liner and said inner and outer conformal throat support sections.

7. The method of claim 1, further comprising the step of inserting a braze alloy between said inner and outer conformal throat support sections.

8. The method of claim 1, further comprising the step of inserting a braze alloy between said outer throat support sections and said inlet and outlet manifolds.

9. The method of claim 1, further comprising the step of inserting a braze alloy between said coolant liner and said inlet and outlet manifolds.

10. The method of claim 1, wherein said steps of forming at least two inner conformal throat support sections and said at least two outer conformal throat support sections comprises forming and assembling two inner conformal throat support sections and two outer conformal throat support sections, said two inner conformal throat support sections and said two outer conformal throat support sections being assembled at about 90° from each other.

11. The method of claim 1, further comprising the step of assembling a structural jacket about said HIP'ed assembly after HIP'ing said HIP assembly.

12. The method of claim 1, wherein said inner and outer conformal throat support sections are formed by drop forging.

13. A rocket engine combustion chamber, comprising:
a) a coolant liner having an outside surface with a plurality of coolant channels formed thereon;
b) at least two inner conformal throat support sections assembled about said outside surface of said coolant liner and being joined at inner throat seam lines to form a closed inner conformal throat outside surface;
c) at least two outer conformal throat support sections assembled about said at least two inner conformal throat support sections so as to cover said inner throat seam lines;
d) an inlet manifold and an outlet manifold assembled about said at least two outer conformal throat support sections, the combustion chamber being hot isostatic pressed (HIP'd), wherein fabrication costs are minimized by obviating any requirement of a structural jacket during HIP'ing and weight is minimized as a result of utilizing said inner and outer conformal throat supports.

14. The rocket engine combustion chamber of claim 13, wherein said at least two inner conformal throat support sections and said at least two outer conformal throat support sections comprise two inner conformal throat support sections and two outer conformal throat support sections.

15. The rocket engine combustion chamber of claim 13, wherein said at least two inner conformal throat support sections and said at least two outer conformal throat support sections comprise two inner conformal throat support sections and two outer conformal throat support sections, said two inner conformal throat support sections and said two outer conformal throat support sections being positioned at about 90° from each other.

16. The rocket engine combustion chamber of claim 13, wherein said coolant liner comprises NARloy-Z.

17. The rocket engine combustion chamber of claim 13, wherein said coolant liner comprises a copper base alloy.

18. The rocket engine combustion chamber of claim 13, wherein said coolant liner comprises a steel base alloy.

* * * * *